United States Patent

Sawyer et al.

[11] B 3,914,275
[45] Oct. 21, 1975

[54] BORATE ESTERS PREPARED BY SUCCESSIVE REACTIONS OF BORIC ACID WITH GLYCOL

[75] Inventors: Arthur W. Sawyer, Hamden; David A. Csejka, Orange, both of Conn.

[73] Assignee: Olin Corporation, New Haven, Conn.

[22] Filed: Jan. 31, 1973

[21] Appl. No.: 328,210

[44] Published under the Trial Voluntary Protest Program on January 28, 1975 as document no. B 328,210.

Related U.S. Application Data

[62] Division of Ser. No. 87,306, Nov. 5, 1970, Pat. No. 3,729,497, which is a division of Ser. No. 653,337, July 14, 1967, Pat. No. 3,637,794.

[52] U.S. Cl............................................... 260/462 R
[51] Int. Cl.² ........................................... C07F 5/04
[58] Field of Search .................................. 260/462 R

[56] References Cited
UNITED STATES PATENTS

| | | | |
|---|---|---|---|
| 3,080,412 | 3/1963 | Young............................. | 260/462 R |
| 3,129,239 | 4/1964 | Lang............................... | 260/462 R |
| 3,303,130 | 2/1967 | Scypinski et al............. | 260/462 R X |
| 3,527,765 | 9/1970 | Reece et al................. | 260/462 R X |

*Primary Examiner*—Leon Zitver
*Assistant Examiner*—Norman P. Morgenstern
*Attorney, Agent, or Firm*—Kenneth P. Glynn; Eugene Zagarella, Jr.

[57] ABSTRACT

Borate esters of the formula:

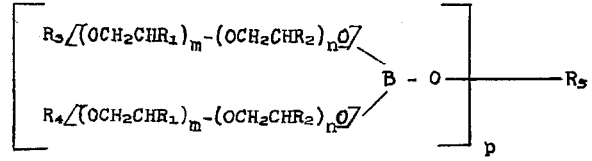

where $R_1$ and $R_2$ are hydrogen or methyl; $R_3$ and $R_4$ are each an independently selected alkyl group having from 1 to 20 carbon atoms; $R_5$ is the organic residue exclusive of reactive hydroxyl groups of a polyol, $p$ is an integer of from 2 to 6 inclusive and $n$ and $m$ are positive integers independently selected in each chain and whose sum in each chain is from 2 to 20 are prepared by successively reacting boric acid with a glycol monoether and a polyol. These esters are useful as stabilizers and corrosion inhibitors for lubricants and non-aqueous hydraulic fluids.

2 Claims, No Drawings

BORATE ESTERS PREPARED BY SUCCESSIVE REACTIONS OF BORIC ACID WITH GLYCOL

This application is a division of application Ser. No. 87,306, filed Nov. 5, 1970 now U.S. Pat. No. 3,729,497, which in turn is a division of application Ser. No. 653,337, filed July 14, 1967 now U.S. Pat. No. 3,637,794.

This invention relates to novel borate esters. In particular, this invention relates to novel borate esters of the general formula:

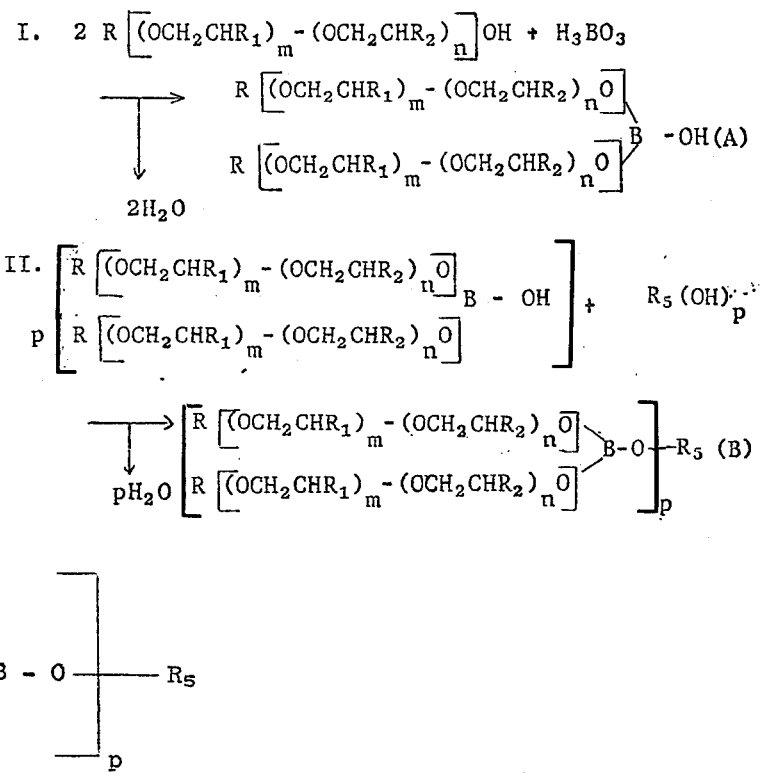

where $R_1$ and $R_2$ are independently selected from the group consisting of hydrogen or methyl; $R_3$ and $R_4$ are each an independently selected alkyl group having from 1 to 20 carbon atoms; $R_5$ is the organic residue exclusive of reactive hydroxyl groups of a polyol, $p$ is an integer of from 2 to 6 inclusive and $n$ and $m$ are positive integers independently selected in each chain and whose sum in each chain is from 2 to 20.

The novel borate esters of this invention are useful as desiccants for drying of gases and as stabilizers and corrosion inhibitors for lubricants and non-aqueous hydraulic fluids, such as those based on glycols, polyglycols, the alkylene oxide adducts of phenols and the dialkyl ethers of glycols and polyglycols.

The novel esters of this invention are stable at elevated temperatures and they possess very high boiling points. On hydrolysis these novel borate esters yield ultimately the glycol monoether, boric acid and the polyol employed in preparing these compounds.

The novel borates of this invention are also useful as ingredients in soldering of brazing fluxes. They also find use as compounding ingredients for natural and synthetic resins, since in addition to serving as plasticizers, they reduce the flammability of the material being plasticized.

In general, the novel compounds of this invention are prepared in two steps. In the first step, a stoichiometric amount of a boron-containng compound, such as orthoboric acid, is reacted with a glycol monoether or mixture of glycol monoethers to yield an intermediate borate compound (A). Secondly, the intermediate borate compound is reacted with a polyol having from 2 to 6 inclusive hydroxyl groups to obtain the novel borate compounds (B) of the present invention. The two reactions, namely the reaction of the first stage and the reaction of the second stage, proceed as shown in the following equations where for purposes of illustration a single glycol monoether is utilized in preparing compound (A):

I. $2 R[(OCH_2CHR_1)_m-(OCH_2CHR_2)_n]OH + H_3BO_3$ $$\xrightarrow[2H_2O]{} \begin{array}{c} R[(OCH_2CHR_1)_m-(OCH_2CHR_2)_n O] \\ R[(OCH_2CHR_1)_m-(OCH_2CHR_2)_n O] \end{array} B-OH \quad (A)$$

II. $p\begin{bmatrix} R[(OCH_2CHR_1)_m-(OCH_2CHR_2)_n O] \\ R[(OCH_2CHR_1)_m-(OCH_2CHR_2)_n O] \end{bmatrix} B-OH + R_5(OH)_p$ $$\xrightarrow[pH_2O]{} \begin{bmatrix} R[(OCH_2CHR_1)_m-(OCH_2CHR_2)_n O] \\ R[(OCH_2CHR_1)_m-(OCH_2CHR_2)_n O] \end{bmatrix} B-O \Big]_p - R_5 \quad (B)$$

wherein $R_1$, $R_2$, $R_5$, $n$, $m$ and $p$ have the same meaning as previously described and R is alkyl of from 1 to 20 carbon atoms.

In the preferred method of preparation boric acid is employed as the boron-containing material and an inert water-azeotroping solvent is added to the reaction vessel along with the glycol monoether starting material. The water-azeotroping solvent is selected so that the azeotrope distils at a temperature below the boiling point of the monohydroxy compound. The temperature of the reaction mixture is initially maintained preferably between 0° and 200°C. and desirably at the distillation temperature of the water-solvent azeotrope. The use of a graduated Barrett receiver facilitates the measurement and separation of the water of condensation. Preferably, the reaction is conducted without an added catalyst to simplify the utilization of the product, although an esterification catalyst may be employed, if desired. When the water removed is equivalent to the stoichiometric requirement to yield the intermediate borate compound (A), the reaction mixture is cooled to a temperature below its reflux temperature and a stoichiometric amount of a polyol "bridging" compound is introduced into the reaction mixture. After stirring the mixture to ensure uniformity, it is again heated so that azeotropic removal of water is resumed. As soon as the removal of water is essentially completed, the solvent is then conveniently removed by distillation. The borate ester remaining after removal of the solvent can be further stripped under reduced pressure to remove any unreacted starting materials present. Other methods are known in the art for purifying the borate ester. For example, the ester can be recovered as the pure product by extraction with a suitable solvent followed by evaporation of the solvent.

Boron compounds which are suitable as starting materials for the preparation of the novel boron esters include orthoboric acid, metaboric acid, boric oxide, and the like. Orthoboric acid, metaboric acid and boric oxide are preferred because of their relatively low cost. Toluene and benzene are the preferred azeotrope-forming solvents; however, other inert solvents may be utilized providing that they form azeotropes with water, such as, for example, xylene, ethylbenzene, mesitylene and the like.

Glycol monoethers suitable for use in the preparation of the novel borate esters of this invention include those of the formula:

$$R[(OCH_2CHR_1)_m—(OCH_2CHR_2)_n]OH,$$

where $R_1$ and $R_2$ are independently selected from the group consisting of hydrogen and methyl, R is an alkyl group containing from 1 to 20 carbon atoms, and m and n are positive integers whose sum is from 2 to 20.

Many glycol monethers are commercially available. Suitable glycol monethers, for example, include:
1. $CH_3(OCH_2CH_2)_2OH$
2. $CH_3(OCH_2CH_2)_3OH$
3. $CH_3(OCH_2CH_2)_{10}OH$
4. $CH_3(OCH_2\ CHCH_3)_3(OCH_2CH_2)OH$
5. $CH_3(OCH_2CH_2)_8(OCH_2CHCH_3)OH$
6. $CH_3(OCH_2CH_2)_6(OCH_2CHCH_3)_{10}OH$
7. $CH_3(0(OCH_3)_2(OCH_2CHCH_3)_2OH$
8. $CH_3(OCH_2CHCH_3)_2OH$
9. $CH_3(OCH_3CHCH_3)_{13}OH$
10. $CH_3(OCH_2CHCH_3)_4OH$
11. $C_2H_5(OCH_2CH_2)_2OH$
12. $C_2H_5(OCH_2CH_2)_{13}OH$
13. $C_2H_5(OCH_2CHCH_3)_4OH$
14. $C_2H_5(OCH_2CHCH_3)_2(OCH_2CH_2)_2OH$
15. $C_4H_9(OCH_2CH_3)_{13}OH$
16. $C_4H_9(OCH_2CH_2)_9OH$
17. $C_4H_9(OCH_2CH_2)_4OH$
18. $C_4H_9(OCH_2CH_3)_3(OCH_2CHCH_3)_{10}OH$
19. $C_4H_9(OCH_2CH_2)_8(OCH\ 2CHCH_3)_{12}OH$
20. $C_5H_{11}(OCH_2CH_2)_3OH$
21. $C_6H_{13}(OCH_2CH_2)_2(OCH_2CHCH_3)_2OH$
22. $C_{10}H_{21}(OCH_2CH2)_{14}OH$
23. $C_{10}\ H_{21}(OCH_2CHCH_3)_3(OCH_2CH_2)OH$
24. $C_{12}H_{25}(OCH_2CHCH_3)_4OH$
25. $C_{15}H_{31}(OCH_2CHCH_3)_2(OCH_2CHCH_3)_2OH$
26. $C_{20}H_{41}(OCH_2CHCH_3)_6OH$ Mixtures of the above-listed glycol monoethers can also be used. Polyols suitable for use in connecting two or more of the intermediae borates of the formula:

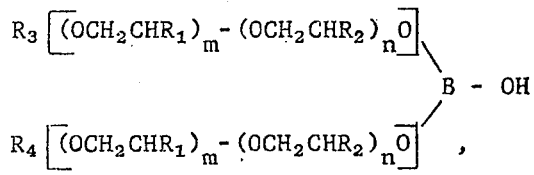

wherein $R_1$, $R_2$, $R_3$, $R_4$, m and n have the same meaning as previously described, include compounds of the formula:

$$R_5(OH)_P,$$

wherein $P$ is an integer of from 2 to 6 inclusive and wherein $R_5$ is the organic residue exclusive of the reactive hydroxyl groups. Useful polyols include (1) glycols of the formula:

$$H(O-R_6)_r—OH$$

wherein $R_6$ is alkylene of from 2 to 10 carbon atoms and $r$ is an integer of from 1 to 10; (2) thioglycols selected frop the group consisting of thiodiethylene glycol and thiodipropylene glycol; (3) amines of the formula:

$$[H(OCH_2CHR_7)_z]_sH(R_8)_{3—s},$$

wherein $s$ is an integer of from 2 to 3 inclusive, $z$ is an integer of from 1 to 10 inclusive, $R_7$ is selected from the group consisting of hydrogen and methyl and $R_8$ is selected from the group consisting of hydrogen and alkyl of from 1 to 4 carbon atoms and (4) polyols having from 3 to 6 inclusive hydroxyl groups.

Specific examples of the above-mentioned polyols include for example, ethylene glycol, propylene glycol, butylene glycol, isobutylene glycol, pentanediol, hexylene glycol, neopentyl glycol, diethylene glycol, tetraethylene glycol, hexaethylene glycol, decaethylene glycol, dipropylene glycol, triisopropylene glycol, tetrapropylene glycol, hexabutylene glycol, 2-ethyl-1,3-hexanediol, thiodiethylene glycol, thiotripropylene glycol, diethanolamine, dipropanolamine, triethanolamine, tributanolamine, methyl diethanolamine, ethyl diethanolamine, methyl dipropanolamine, ethyl dipropanolamine, methyl dibutanolamine, propyl dipropanolamine, butyl diethanolamine, glycerol, trimethylol propane, pentaerythritol, sorbitol, mannitol and 1,2,6-hexanetriol.

The novel borate esters of this invention can be utilized to prepare brake fluid having boiling points in excess of 490° F. In such brake fluid compositions these borates form the major component and are present in amounts of from about 55 to about 90 per cent by weight of the final fluid. A typical hydraulic fluid composition utilizing the product of Example V, which has the formula:

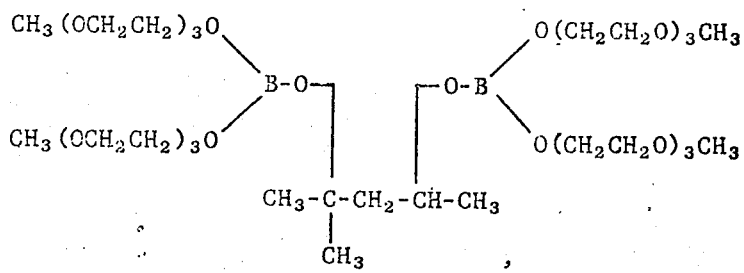

is given below:

| | Per Cent by Weight |
|---|---|
| Product of Example V | 75.0 |
| Triethylene glycol monomethyl ether | 7.5 |
| Diethanolamine | 2.0 |
| Polyethylene glycol (Mol. wt 200) | 15.0 |
| Sodium Nitrite | 0.05 |

This formulation was tested in accordance with the appropriate methods of the SAE J70c for Hydraulic Brake Fluids and the following properties were observed:

| Reflux Boiling Point | | 509°F |
|---|---|---|
| Viscosity | at 212°F | 2.7 c |
| | at −40°F | 3380 cs |
| Cold Test | 6 days at −40°F | clear liquid |
| | 6 hours at 58°F | clear liquid |
| Rubber Swelling | (Natural Rubber, 120 hours 158°F | 2.5 % diameter |
| | (Styrene-butadiene, 70 hours, 248°F | 4.2% diameter |
| Water Tolerance | (3.5 per cent vol. added water) | |
| | 24 hours at −40°F. | clear liquid |
| | 24 hours at 140°F. | clear liquid |

These values illustrate the highly superior properties of hydraulic fluids prepared with the novel borates of this invention. The addition of 3.5 per cent volume of water to the above formulation yielded a fluid having a reflux boiling point of 368°F. according to the procedure of ASTM 1120-65, whereas typical currently commercial brake fluids with 3.5 per cent added water have inferior (i.e., below 302°F. when tested in the same manner.

The following examples illustrate specific embodiments of this invention and are to be considered not limitative:

EXAMPLE I

A total of 985 g. (6 moles) of $CH_3(OCH_2CH_2)_3OH$, 185.5 g. (3 moles) of orthoboric acid and 510 ml. of toluene were mixed together in a 2 liter, round-bottom, 3-neck flask equipped with a magnetic stirrer. With heating at reflux temperature and stirring, the water of condensation was removed as formed by azeotropic action. When 108 ml. (6 moles) of water had separated, the reaction mixture was allowed to cool below reflux temperature. Then 179 g. (1.5 moles) of 2-methyl-2,4-pentanediol was introduced and the reaction mixture was stirred and reheated to reflux temperature in order to resume azeotroping out the water of condensation. As soon as the water had been essentially all removed, the toluene was distilled off and the residue containing the product was stripped under water aspirator vacuum at 90° to 120°C. pot temperature for 1.5 hours - in order to remove unreacted products. A total of 1192 g. of product (essentially 100 per cent of theory), a clear colorless liquid with a viscosity at −40°C. of approximately 1400 cs and having the formula:

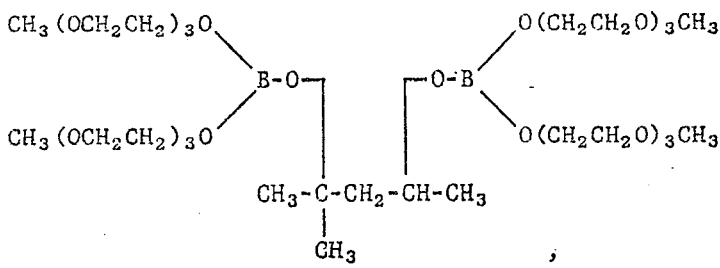

was obtained

| Analysis: | Per Cent B |
|---|---|
| Calculated: | 2.72 |
| Found: | 2.78 |

EXAMPLE II

In a manner similar to that in Example I, 242.7 g. (2 moles) of $CH_3(OCH_2CH_2)_2OH$, 61.85 g. (1 mole) orthoboric acid and 230 ml. toluene were mixed together and heated at reflux temperature until 36 ml. (2 moles) of water had been removed as the azeotrope. The reaction mixture was allowed to cool below reflux temperatue and 53.6 g. (0.5 mole) of diethylene glycol was introduced, with continued stirring. The mixture was reheated to resume axzeotroping action. When water separation essentialy had ceased, the toluent was distilled off and the residue was stripped under full water aspirator vacuum at a pot temperature of 138° to 140°C. for 10 minutes to remove unreacted starting materials. Product in the amount of 291 g. (96 per cent of the theoretical yield), a clear, light straw-colored liquid, was obtained. This product, which has the formula:

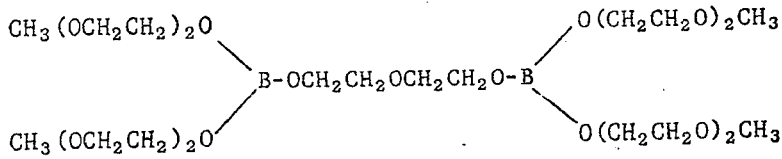

exhibited a viscosity at −40°C of 3632 cs.

| Analysis | Per Cent | | |
|---|---|---|---|
| | C | H | B |
| Calculated: | 47.86 | 3.70 | 3.59 |
| Found: | 46.76, 46.49 | 8.46, 8.70 | 3.57, 3.60 |

EXAMPLE III

In a manner similar to Example I, 324 g. (2 moles) of $CH_3(OCH_2CH_2)_3OH$, 61.8 g. (1 mole) of orthoboric acid and 265 ml. of toluene were mixed together and heated until a total of 36 ml. (2 moles) of water had been removed as the azeotrope. 45.4 g. (0.33 mole) of commercial trimethylol propane was introduced into the hot liquid. As soon as the solid trimethylol propane flakes had dissolved in the stirred reaction mixture, azeotropic removal of water was resumed. When separation of water had essentially ceased, the toluene was distilled off and the residue was stripped at 140° to 148°C. pot temperature under full water aspirator vacuum for approximately 10 minutes. A total of 375.4 g. (99.5 percent of theoretical yield) of a clear, colorless liquid having the formula:

EXAMPLE IV

In a manner similar to the preceding examples, 324 g. (2 moles) of $CH_3(OCH_2CH_2)_3OH$, 61.8 g. (1 mole) of boric acid and 275 ml. of toluene were mixed together and heated with continuous stirring until 36 ml. of water had been removed as the azeotrope. Then 30.4 g. (0.17 mole) of sorbitol was introduced and azeotroping was continued until separation of water had essentially ceased. After the toluene had been distilled off, the residue was stripped under full water aspirator vacuum at a pot temperature of 145° to 155°C. for approximately 10 minutes to remove unreacted starting materials. A total of 360 g. of product (97 per cent of theory), a clear, colorless liquid, having the formula:

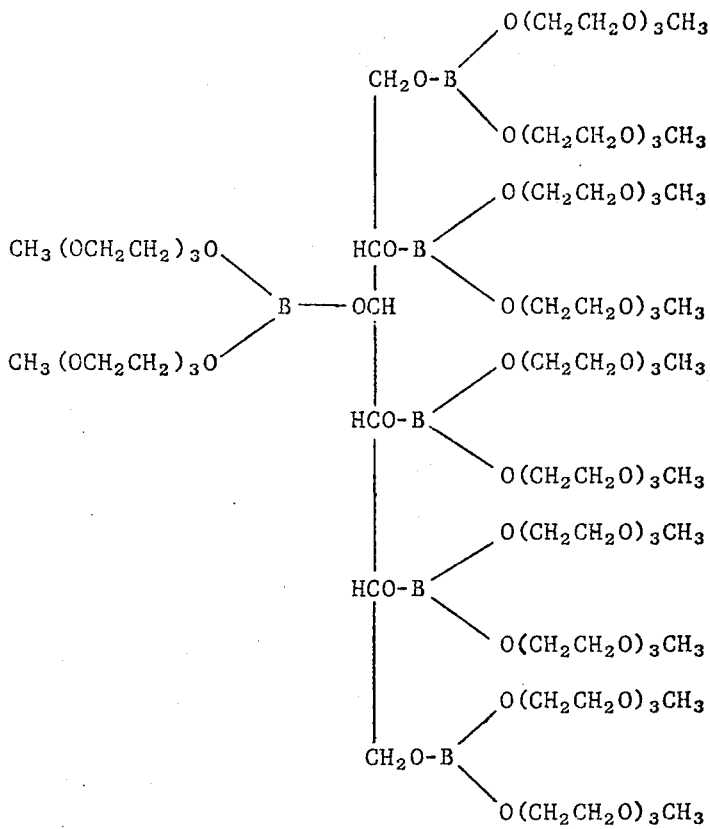

was obtained. The viscosity of the product at −40°C. was 11,827 cs.

| Analysis: | Per Cent B |
|---|---|
| Calculated: | 3.00 |
| Found: | 2.92 |

EXAMPLE V

In a manner similar to Example I, 641.3 g. of commercial (99 per cent) $CH_3(OCH_2CH_2)_2OH$, 164.9 g. orthoboric acid and 200 ml. of toluene were mixed together and heated. Simultaneously, the water of condensation formed was removed overhead as the water-toluene azeotrope. After essentially 5.33 moles of water had been removed, the reaction mixture was allowed to cool below reflux temperature following which 82.7 g. of 99 per cent glycerine was added. Azeotropic removal of water was resumed. As soon as the water separation had essentially ceased, the toluene was removed by distillation and the remaining reaction mixture stripped under full aspirator vacuum at a pot temperature of 145° to 150°C. for 15 minutes to remove unreacted starting materials. Borate ester in the amount of 734 g. (98.5 per cent of the theoretical

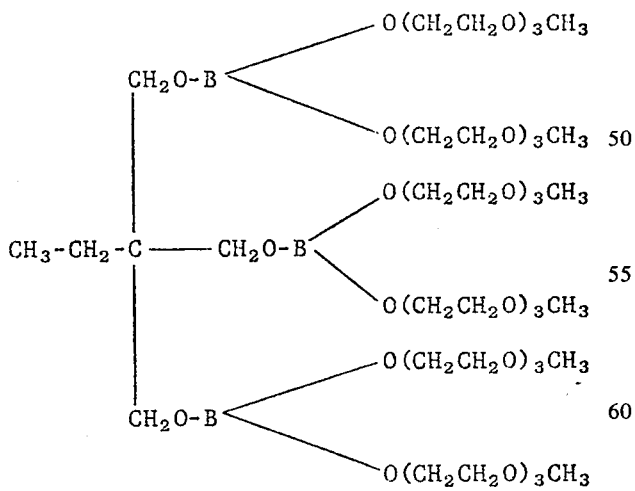

was obtained. The product exhibited a viscosity of −40°C. of 6161 cs.

| Analysis: | Per Cent B |
|---|---|
| Calculated: | 2.88 |
| Found: | 2.87 | yield), a clear, light straw-colored liquid, having the formula:

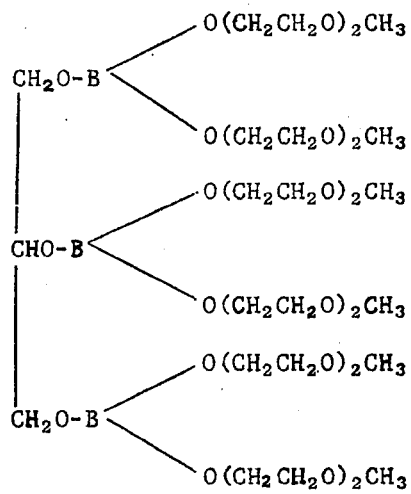

was obtained.

| Analysis: | Per Cent B |
|---|---|
| Calculated: | 3.88 |
| Found: | 4.17 |

EXAMPLE VI

In a manner similar to Example III, a lower homolog, specifically $CH_3[OCH_2CH_2]_2OH$ was substituted, using the same molar ratios of other reactants as were used in Example III, to yield a clear, light-colored product (96 percent of theoretical) having a formula:

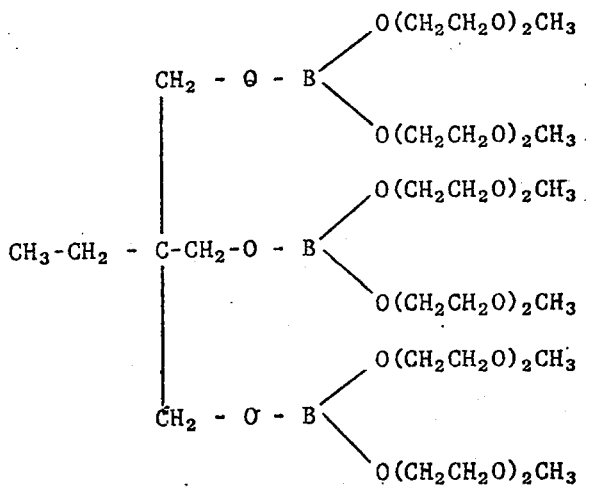

The product was fluid at $-40°C$.; viscosity at $-40°C$. = 2627cs.

| Analysis: | Per Cent B |
|---|---|
| Calculated: | 3.57 |
| Found: | 3.87 |

EXAMPLE VII

Example I was repeated using a lower homolog, specifically $CH_3(OCH_2CH_2)_2OH$, with the same molar ratios of other reactants, to yield a clear colorless liquid product (97 per cent of theory) having the following formula:

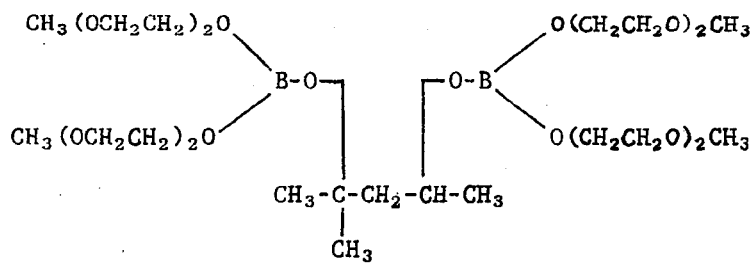

The viscosity of the product at minus 40°C. was approximately 450 cs.

| Analysis: | Per Cent B |
|---|---|
| Calculated: | 3.52 |
| Found: | 3.66 |

EXAMPLE VIII

In a manner similar to preceding examples, 324 g. (2 moles) of $CH_3(OCH_2CH_2)_3OH$, 61.8 g. (1 mole) orthoboric acid and 250 ml. of toluene were mixed together and heated with continuous stirring until 36.5 ml. of water was removed as the azeotrope. Then 34.4 g. (0.25 mole) of pentaerythritol was introduced and stirred until it dissolved. Azeotropic removal of water was continued and an additional 17 ml. of water was removed and recovered. The mixture was then stripped under full water aspirator vacuum while heating to 154°C. pot temperature to remove the toluene and any unreacted starting materials. A total of 364.5 g. of product (99.5 per cent of theoretical) an essentially clear colorless liquid with a viscosity at $-40°C$. of 9117 cs., having the formula:

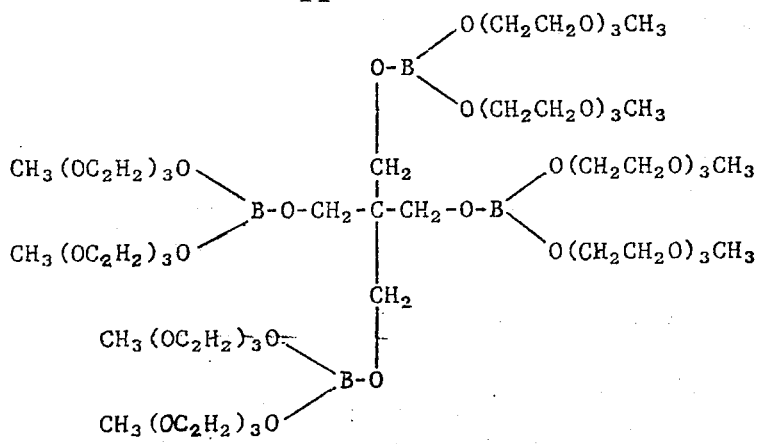

was obtained.

| Analysis: | Per Cent B |
|---|---|
| Calculated: | 2.92 |
| Found: | 2.96 |

EXAMPLE IX

In a manner similar to the preceding examples, 242.7 g. (2 moles) of commercial $CH_3(OCH_2CH_2)_2OH$, 61.84 g. (1 mole) boric acid and 220 ml. toluene were mixed together and heated with continuous stirring until 36 ml. of water had been removed as the azeotrope. Then 61.9 g. (0.5 mole) of commercial thiodiethylene glycol was introduced. Azeotropic removal of water was continued until separation of water had essentially ceased. After stripping the product under full water aspirator vacuum to a pot temperature of 159°C., to remove toluene and unreacted volatile materials, 298.5 g. (96.8 per cent of theoretical) of clear yellow-brown liquid product was obtained. The product which exibited a viscosity at −40°C. of 5200 cs., has the formula:

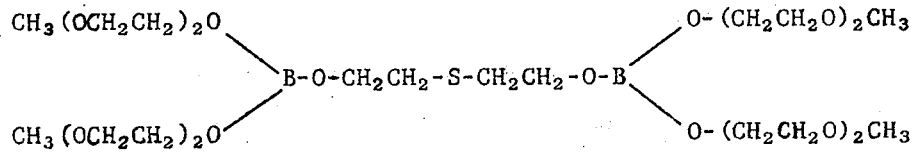

| Analysis: | Per Cent | | | |
|---|---|---|---|---|
| | C | H | B | S |
| Calculated | 46.62 | 8.48 | 3.50 | 5.19 |
| Found | 45.97,46.06 | 8.17,8.36 | 3.36 | 5.19,5.31 |

EXAMPLE X

In a manner similar to Example IX, 2 moles of $CH_3(OCH_2CH_2)_2OH$, 1 mole of orthoboric acid and 220 ml. of toluene were mixed together and heated with stirring until 36 ml. of water had been separated. Net 54.65 g. (0.5 mole) of diethanolamine was introduced and azeotropic removal of water was continued overnight. The reaction mixture was stripped under full water aspirator vacuum, with stirring and heating to a pot temperature of 143°C to remove all toluene and unreacted volatile starting materials. The resultant product, which weighed 281 g. (93 per cent of theoretical), was a clear, light-brown liquid with a viscosity at −40°C. of approximately 15,500 cs. and having the following formula:

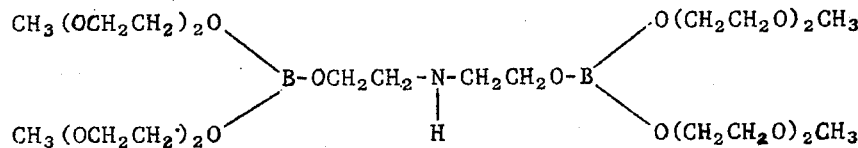

| Analysis: | Per Cent | | | |
|---|---|---|---|---|
| | C | H | B | N |
| Calculated | 47.9 | 8.87 | 3.60 | 2.33 |
| Found | 46.92,46.96 | 8.77,8.54 | 3.62 | 2.55,2.65 |

EXAMPLE XI

In a manner similar to Example IX, 2 moles of $CH_3(OCH_2CH_2)_2OH$, 1 mole of orthoboric acid and 220 ml. toluene were mixed together and heated with stirring until 36 ml of water had been separated. Next 61.77 g. (0.5 mole) of methyl diethanolamine was introduced and azeotropic removal of water was continued overnight. The reaction mixture was then stripped under full water aspirator vacuum, with stirring and heating to a pot temperature of 140°C. There was obtained 301 g. of product (98 per cent of theoretical), a clear, brown liquid with a viscosity at −40'C. of 1783 cs. and having the formula:

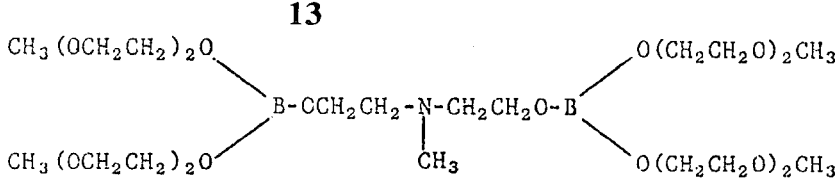

| Analysis   | Per Cent    |           |      |           |
|------------|-------------|-----------|------|-----------|
|            | C           | H         | B    | N         |
| Calculated | 48.79       | 9.01      | 3.52 | 2.28      |
| Found      | 47.04,46.71 | 8.71,8.80 | 3.35 | 2.49,2.61 | pentanediol was introduced and azeotropic removal of water was resumed and continued essentialy to cessation. The product was then stripped to a pot temperature at 172°C. under full water aspirator vacuum to yield 208.3 g. (97 per cent theory) of a clear, colorless liquid product having the formula:

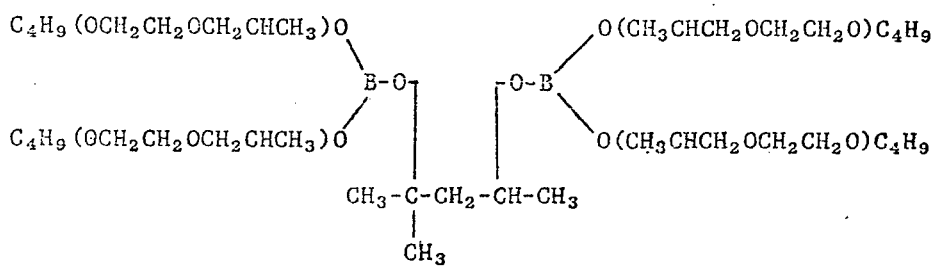

EXAMPLE XII

A total of 592 g. (4 moles) of $CH_3(OCHCH_3CH_2)_2OH$, 123.7 g. (2 moles) of orthoboric acid and 325 ml. toluene were mixed and heated together while simultaneously 72 ml. of water was removed as the azeotrope. Then 118.2 g. (1 mole) of 2-methyl-2,4-pentanediol was introduced and the azeotropic removal of water was continued overnight, at which time the separation of water essentially had ceased. The reaction mixture was stripped under full water aspirator vacuum while heating to a pot temperature of 140°C. to remove the toluene and any unreacted volatile starting materials. Product was recovered in the amount of 704 g. (97 per cent of theoretical), a clear, yellow liquid having the formula At −40°C. the product was a clear liquid.

| Analysis:   | Per Cent B |
|-------------|------------|
| Calculated: | 2.50       |
| Found:      | 2.61       |

EXAMPLE XIV

A mixture of homologous polyethylene glycol monomethyl ethers with an average molecular weight of 186 (calculated from determined hydroxyl number of 301) was employed as a reactant in this experiment. The

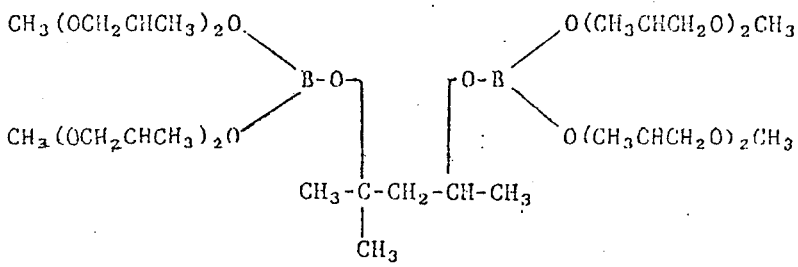

The product was a clear liquid at −40°C.

| Analysis:   | Per Cent B |
|-------------|------------|
| Calculated: | 2.98       |
| Found:      | 3.10       |

EXAMPLE XIII

A sample of commercial butoxy ethoxy propanol was distilled, discarding approximately 10 per cent forecut and approximately 20 per cent tail cut. 177 g. (1 mole) of the main (center) cut of colorless butoxy ethoxy propanol, 30.9 g. (0.5 mole) of boric acid and 200 ml. of toluene were mixed and heated together, in a manner similar to the preceding examples, to remove 18 ml. (1 mole) of water. The 30 g. (0.25 mole) of 2-methyl-2,4- lowest molecular weight component of this mixture was triethylene glycol monomethyl ether and the average formula of the mixture was:

$$CH_3(OCH_2CH_2)_{3.5}OH.$$

784 g. (4 moles) of this mixture and 123.7 g. (2 moles) of USP boric acid were reacted in toluene, in the manner of previous examples, until 72 ml. (4 moles) of water had been removed as the azeotrope. Then 119 g. (1 mole) of hexylene glycol was introduced and azeotropic removal of water was resumed and continued essentially to cessation. Stripping under vacuum to 163°C. pot temperature in the manner of other examples, yielded 914 g. (99.5 per cent of theoretical) of a clear, light-yellow product having the formula:

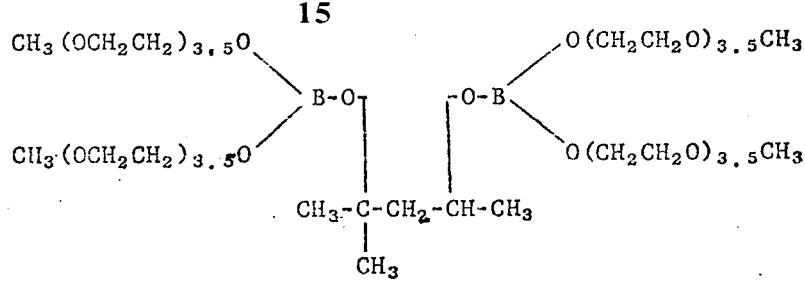

At −40°C. the product was a clear liquid.

| Analysis: | Per Cent | | |
|---|---|---|---|
| | C | H | B |
| Calculated: | 52.0 | 8.19 | 2.36 |
| Found: | 51.45, 51.78 | 8.96, 9.09 | 2.39 |

EXAMPLE XV

In a manner similar to the preceding examples; 324 g. (2 moles) of $CH_3(OCH_2CH_2)_3OH$, 61.8 g. (1 mole) of orthoboric acid and 250 ml. of toluene were mixed and heated together until 36 ml. (2 moles) of water was separated as the azeotrope. A total of 54.3 g. (0.5 mole) of 2,2-dimethyl-1,3-propanediol was then introduced. Azeotropic removal of water was resumed and continued until water removal essentially ceased. The product was stripped to a pot temperature of 165°C. under vacuum as in the previous examples. Product in the amount of 374 g. (97 per cent of theoretical), a clear colorless liquid product having a viscosity of 1605 cs. at −40°C. and having the formula:

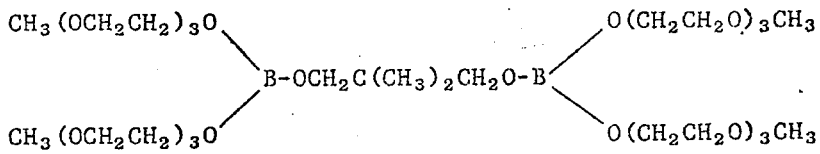

was recovered.

| Analysis: | Per Cent B |
|---|---|
| Calculated: | 2.79 |
| Found: | 2.82 |

EXAMPLE XVI

Commercial isodecanol was oxypropylated by conventional techniques by charging isodecanol and an alkaline catalyst to a pressure reactor and then introducing propylene oxide under conditions which yielded a clear colorless liquid. This oxypropylated product was found to have a hydroxyl number of 123, a calculated average molecular weight of 456 and the average formula to be:

$$C_{10}H_{21}(OCH_2CHCH_3)_{5.1}OH$$

In a manner similar to previous examples, 456 g. (1 mole) of above oxypropylated product, 30.9 g. (0.5 mole) of orthoboric acid and 200 ml. of toluene were mixed and heated together until 18 ml. (1 mole) of water had been recovered as the azetrope. 29.6 g. (0.25 mole) of 2-methyl-2,4-pentanediol was then introduced. Azeotroping was resumed and continued overnight at which time water separation had essentially ceased. The product was stripped to a pot temperature of 138°C. under vacuum as in previous examples. A total of 490 g. of a colorless, liquid product (essentially 100 per cent of theory), a clear, viscous liquid at −40°C., having the formula:

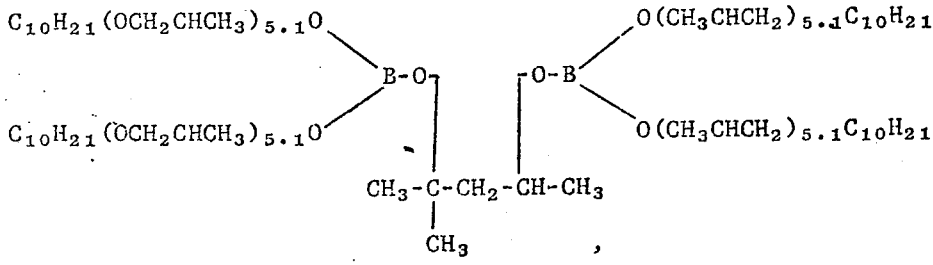

was obtained.

| Analysis: | Per Cent B |
|---|---|
| Calculated: | 1.10 |
| Found: | 1.11 |

Many other brake fluid compositions which utilize the novel borate esters of this invention are described in Arthur W. Sawyer and David A. Csejka application for Water-Insensitive Hydraulic Fluids containing Bis-Borate Esters or Bridge-Borate Esters application Ser. No, 653,335, filed July 14, 1967, now abandoned which application is incorporated in its entirety herein.

What is claimed is:

1. A borate ester of the formula:

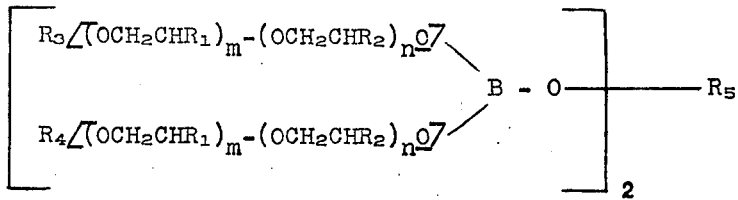

where $R_1$ and $R_2$ are independently selected from the group consisting of hydrogen and methyl; $R_3$ and $R_4$ are each an independently selected alkyl group having from 1 to 20 carbon atoms; $R_5$ is the organic residue exclusive of reactive hydroxyl groups of a thioglycol selected from the group consisting of thiodiethylene glycol and thiodipropylene glycol and $n$ and $m$ are positive integers whose sum is from 2 to 20.

2. A borate ester of claim 1 having the formula:

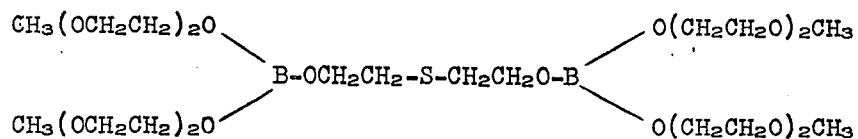

* * * * *

UNITED STATES PATENT OFFICE
CERTIFICATE OF CORRECTION

Patent No. 3,914,275                          Dated October 21, 1975

Inventor(s) Arthur W. Sawyer and David A. Csejka

It is certified that error appears in the above-identified patent and that said Letters Patent are hereby corrected as shown below:

On the cover page, the title of the invention should read
--BORATE ESTERS PREPARED BY SUCCESSIVE REACTIONS OF BORIC ACID
WITH GLYCOL MONOETHERS AND POLYOLS--.

At the top of column 1, the title of the invention should read
--BORATE ESTERS PREPARED BY SUCCESSIVE REACTIONS OF BORIC ACID
WITH GLYCOL MONOETHERS AND POLYOLS--.

Column 1, line 69, "boron-containng" should read --boron-containing--.

Column 3, (formula 18), the formula should read
--$C_4H_9(OCH_2CH_2)_3(OCH_2CHCH_3)_{10}OH$--.

Column 4, line 22, the word "frop" should read --from--.

Column 4, line 26, the generic formula should read
--$[H(OCH_2CHR_7)_z]_sN(R_8)_{3-s}$--.

Column 6, lines 39-40, the word "temperatue" should read
--temperature--.

Column 6, line 42, the word "axzeotroping" should read
--azeotroping--.

Column 6, line 43, the word "essentialy" should read
--essentially--.

Column 6, line 43, the word "toluent" should read --toluene--.

Column 12, line 66, the temperature "-40'C." should read -- 40°C --.

Signed and Sealed this sixth Day of April 1976

[SEAL]

Attest:

RUTH C. MASON
*Attesting Officer*

C. MARSHALL DANN
*Commissioner of Patents and Trademarks*